(12) United States Patent
Rao et al.

(10) Patent No.: US 11,498,684 B2
(45) Date of Patent: Nov. 15, 2022

(54) SELF-STOWAGE ASSEMBLY FOR A SEAT

(71) Applicant: AMI Industries, Inc., Colorado Springs, CO (US)

(72) Inventors: Sreekanth Koti Ananda Rao, Bangalore (IN); Pradeep Acharya, Bangalore (IN)

(73) Assignee: AMI INDUSTRIES, INC., Colorado Springs, CO (US)

(*) Notice: Subject to any disclaimer, the term of this patent is extended or adjusted under 35 U.S.C. 154(b) by 574 days.

(21) Appl. No.: 16/534,794

(22) Filed: Aug. 7, 2019

(65) Prior Publication Data
US 2020/0198787 A1 Jun. 25, 2020

(30) Foreign Application Priority Data
Dec. 19, 2018 (IN) .............................. 201811048167

(51) Int. Cl.
  *B64D 11/06* (2006.01)
  *A47C 7/56* (2006.01)
(52) U.S. Cl.
  CPC .......... *B64D 11/0639* (2014.12); *A47C 7/566* (2013.01); *B64D 11/064* (2014.12); *B64D 11/0698* (2014.12)
(58) Field of Classification Search
  CPC .............. B64D 11/0639; B64D 11/064; B64D 11/0698; A47C 7/566
  USPC ....................................................... 297/16.1
  See application file for complete search history.

(56) References Cited

U.S. PATENT DOCUMENTS

| 4,850,159 | A | * | 7/1989 | Conner | A47C 1/126 52/9 |
| 5,257,852 | A | * | 11/1993 | Tsuneki | A47C 1/121 188/291 |
| 5,328,231 | A | * | 7/1994 | Raymond | A47C 1/12 297/13 |
| 8,820,836 | B2 | * | 9/2014 | Stewart | A47C 1/12 297/335 |
| 9,835,343 | B2 | * | 12/2017 | Schafer | A47C 1/12 |
| 2008/0217979 | A1 | | 9/2008 | King | |
| 2011/0024246 | A1 | | 2/2011 | Mitjans | |
| 2014/0319275 | A1 | | 10/2014 | Najd et al. | |

FOREIGN PATENT DOCUMENTS

| DE | 102014116064 A1 | | 5/2016 |
| DE | 102015225619 | * | 6/2017 |
| EP | 2031272 | * | 3/2009 |
| EP | 2266440 A1 | | 12/2010 |
| KR | 101490668 B1 | | 3/2015 |

OTHER PUBLICATIONS

European Search Report Application No. EP19217496; dated Jun. 18, 2020; pp. 9.

* cited by examiner

*Primary Examiner* — Mark R Wendell
(74) *Attorney, Agent, or Firm* — Cantor Colburn LLP

(57) ABSTRACT

A seat with self-stowage capability is provided. The seat includes a seat pan lever which is rotatable between stowed and open positions, a fixed seat structure and an elastic assembly. The fixed seat structure includes an annulus. The elastic assembly includes a damper and an arc-spring disposable within the annulus to permit first rotations of the seat pan lever from the stowed position to the open positions and to urge second rotations of the seat pan lever from the open positions to the stowed position.

20 Claims, 4 Drawing Sheets

SELF-STOWAGE ASSEMBLY FOR A SEAT

CROSS-REFERENCE TO RELATED APPLICATIONS

This application claims the benefit of Indian Patent Application No. 201811048167, filed Dec. 19, 2018, which is incorporated herein by reference in its entirety.

BACKGROUND

The following description relates to aircraft seats and, more particularly, to a self-stowage assembly for an aircraft seat that uses an arc-compression spring and a foam damper.

Currently, certain aircraft seats have self-stowage capability. This self-stowage capability is achieved by the use of torsion spring plates and damper systems. Between the torsion spring plates, the damper systems and the other supporting components, self-storage systems for aircraft sets tend to have large numbers of parts. Moreover, torsion spring plates tend to be relatively unreliable and fail.

BRIEF DESCRIPTION

According to an aspect of the invention, a seat with self-stowage capability is provided. The seat includes a seat pan lever which is rotatable between stowed and open positions, a fixed seat structure and an elastic assembly. The fixed seat structure includes an annulus. The elastic assembly includes a damper and an arc-spring disposable within the annulus to permit first rotations of the seat pan lever from the stowed position to the open positions and to urge second rotations of the seat pan lever from the open positions to the stowed position.

In accordance with additional or alternative embodiments, a fully open position is 90° from the stowed position.

According to another aspect of the invention, a seat with self-stowage capability is provided. The seat includes a seat pan including a lever, a boss coupled with the lever and defining an axis about which the lever is rotatable and a first stopper coupled with the boss, a fixed seat structure including a second stopper and an annulus in which the second stopper is fixed and the first stopper is disposable and an elastic assembly disposable within the annulus between the first and second stoppers to permit first movements of the first stopper through the annulus relative to the second stopper in association with first rotations of the lever about the axis and to urge second movements of the first stopper through the annulus relative to the second stopper in association with second rotations of the lever about the axis.

In accordance with additional or alternative embodiments, the lever is rotatable about the axis between a stowed rotational position and open rotational positions.

In accordance with additional or alternative embodiments, the boss is partially cylindrical and the first stopper extends radially outwardly from an exterior surface of the boss.

In accordance with additional or alternative embodiments, the seat pan includes a pair of first stoppers and the fixed seat structure includes a pair of second stoppers.

In accordance with additional or alternative embodiments, the elastic assembly includes a damper, which is disposable for abutment with the first stopper and an arc-spring, which is anchored between the second stopper and the damper.

In accordance with additional or alternative embodiments, the damper includes material that is one or more of deformable and compliant.

In accordance with additional or alternative embodiments, the arc-spring includes an arc-compression spring.

In accordance with additional or alternative embodiments, the elastic assembly further includes a bearing assembly to support the elastic assembly.

In accordance with additional or alternative embodiments, a full extension of the arc-spring positions the damper and the first stopper less than halfway around the annulus.

According to yet another aspect of the invention, an aircraft is provided and includes a fixed wall structure and a seat with self-stowage capability. The seat includes a seat pan including a lever, a boss coupled with the lever and defining an axis about which the lever is rotatable relative to the fixed wall structure between stowed and open positions and a first stopper coupled with the boss, a fixed seat structure which is fixed to the fixed wall structure and includes a second stopper and an annulus in which the second stopper is fixed and the first stopper is disposable and an elastic assembly disposable within the annulus between the first and second stoppers to permit first movements of the first stopper through the annulus relative to the second stopper in association with first rotations of the lever about the axis and to urge second movements of the first stopper through the annulus relative to the second stopper in association with second rotations of the lever about the axis.

In accordance with additional or alternative embodiments, a fully open position is 90° from the stowed position.

In accordance with additional or alternative embodiments, the boss is partially cylindrical and the first stopper extends radially outwardly from an exterior surface of the boss.

In accordance with additional or alternative embodiments, the seat pan includes a pair of first stoppers and the fixed seat structure includes a pair of second stoppers.

In accordance with additional or alternative embodiments, the elastic assembly includes a damper, which is disposable for abutment with the first stopper and an arc-spring, which is anchored between the second stopper and the damper.

In accordance with additional or alternative embodiments, the damper includes material that is one or more of deformable and compliant.

In accordance with additional or alternative embodiments, the arc-spring includes an arc-compression spring.

In accordance with additional or alternative embodiments, the elastic assembly further includes a bearing assembly to support the elastic assembly.

In accordance with additional or alternative embodiments, a full extension of the arc-spring positions the damper and the first stopper less than halfway around the annulus.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a seat with self-stowage capability is provided for use with an aircraft, for example. The seat includes a seat pan lever which is rotatable between stowed and open positions, a fixed seat structure that includes an annulus and an elastic assembly. The elastic assembly includes a damper and an arc-spring disposable within the annulus to permit first rotations of the seat pan lever from the stowed position to the open positions and to urge second rotations of the seat pan lever from the open positions to the stowed position.

Figure 1A:
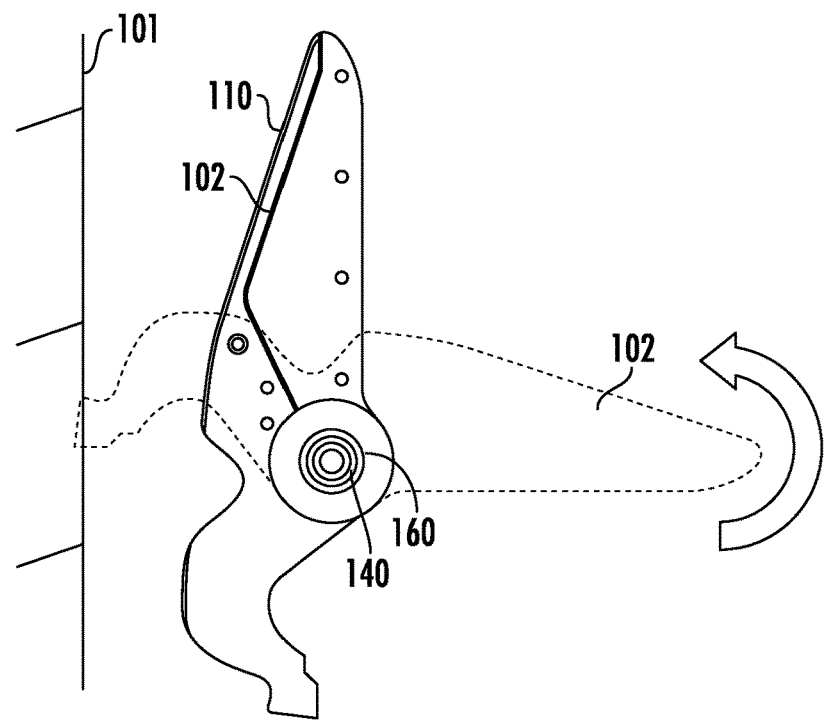
FIG. 1A is a side view of a seat with self-stowage capability in a stowed position in accordance with embodiments.
Figure 1B:
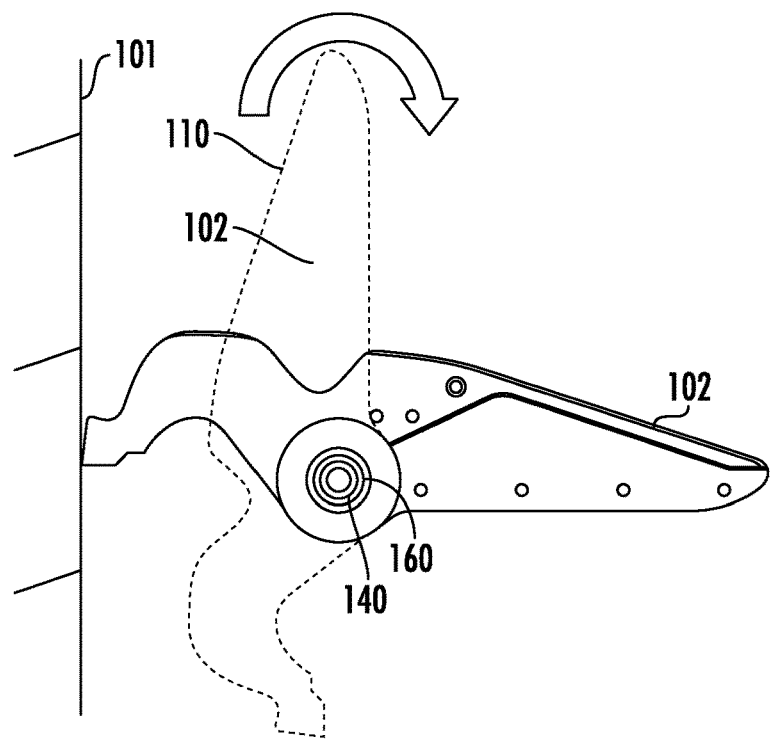
FIG. 1B is a side view of the seat of FIG. 1A in a fully open position in accordance with embodiments.

With reference to FIGS. 1A and 1B, an aircraft is provided with an interior. Within the interior, a fixed wall structure 101 is fixed to an airframe of the aircraft and a seat 102 is provided with self-stowage capability whereby the seat 102 is disposed and configured to occupy a stowed position relative to the fixed wall structure 101 (see FIG. 1A), a fully opened position relative to the fixed wall structure 101 which is at or about 90° from the stowed position (see FIG. 1B) and any partially opened positions that are defined between the stowed position and the fully opened position.

With reference to FIGS. 2, 3, 4A and 4B, the seat 102 of FIGS. 1A and 1B includes a seat pan 110, a fixed seat structure 140 and an elastic assembly 160.

The seat pan 110 includes a seat pan lever 111, a boss 112 and a first stopper 113. The seat pan lever 111 has an elongate body 114 with a first end 115 on which a seat cushion is disposable and a second end 116 opposite the first end 115. The boss 112 is coupled with the seat pan lever 111 between the first end 115 and the second end 116 to protrude from a plane of the elongate body 114. The boss 112 can be partially cylindrical and formed to define an aperture 117 as well as a rotational axis 118. The rotational axis 118 extends through the aperture 117 and the seat pan lever 111 is rotatable about the rotational axis 118 relative to the fixed wall structure 101 between a stowed position, which is associated with the stowed position of the seat 102 (see FIG. 1A) and open positions, which are associated with the fully open position of the seat 102 (see FIG. 1B) and with the partially opened positions of the seat 102. The first stopper 113 can be provided as one or more first stoppers 113 that extend radially outwardly from an exterior surface 1120 of the boss 112.

Although the first stopper 113 can be provided as one or more first stoppers 113, the following description will relate to the case in which the first stopper 113 is provided as a pair of first stoppers 113 that each extends radially outwardly from opposite sides of the exterior surface 1120 of the boss 112. This is being done for clarity and brevity and is not intended to otherwise limit the scope of the application.

The fixed seat structure 140 is fixed in terms of position and rotation to the fixed wall structure 102 of FIGS. 1A and 1B and includes base 141, an inner hub 142, an outer hub 143 and a second stopper 144. The base 141 is generally flat and circular. The inner hub 142 extends from a central portion of the base 141 and the outer hub 143 extends from a periphery of the base 141 to surround the inner hub 142. The inner hub 142 and the outer hub 143 thus define an annulus 145 of the fixed seat structure 140 that extends annularly around the space between an exterior surface of the inner hub 142 and an interior surface of the outer hub 143. The second stopper 144 extends radially inwardly from the outer hub 143 and is fixed in terms of position and rotation within the annulus 145.

Although the second stopper 144 can be provided as one or more second stoppers 144, the following description will relate to the case in which the second stopper 144 is provided as a pair of second stoppers 144 that each extends radially inwardly from opposite sides of the outer hub 143. This is being done for clarity and brevity and is not intended to otherwise limit the scope of the application.

When the seat 102 of FIGS. 1A and 1B is completely assembled, each of the pair of first stoppers 113 is disposable within and movable along a respective arc through the annulus 145 relative to a corresponding one of the pair of second stoppers 144.

The elastic assembly 160 is operably disposable within the annulus 145 between each one of the pair of first stoppers 113 and each corresponding one of the pair of second stoppers 144. The elastic assembly 160 includes a pair of dampers 161 that are each disposable for abutment with a corresponding one of the pair of first stoppers 113 and a pair of arc-springs 162 that are each anchored to a corresponding one of the pair of second stoppers 144 and a corresponding one of the pair of dampers 161.

Figure 4A:
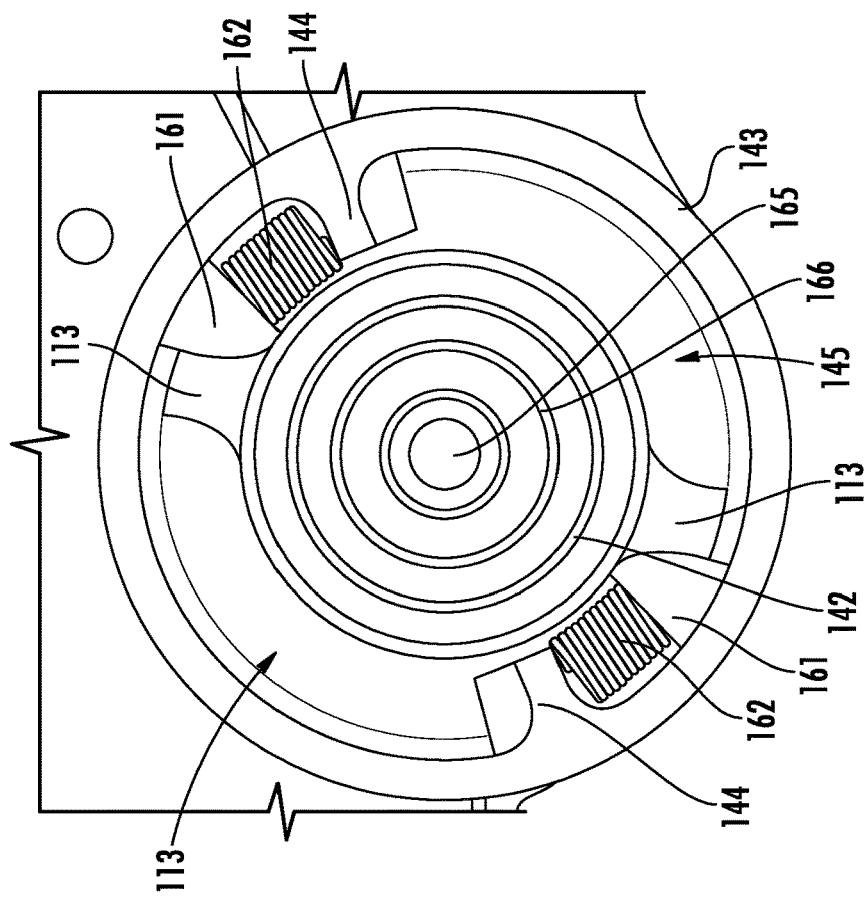
FIG. 4A is an axial view of an elastic assembly with the seat of FIGS. 1A and 1B in the stowed position in accordance with embodiments.

In accordance with embodiments, full extensions of the arc-springs 162 effectively positions each of the dampers 161 and each of the first stoppers 113 less than halfway around the annulus 145 (see FIG. 4A). As such, the first stoppers 113 do not impact the second stoppers 144.

Figure 2:
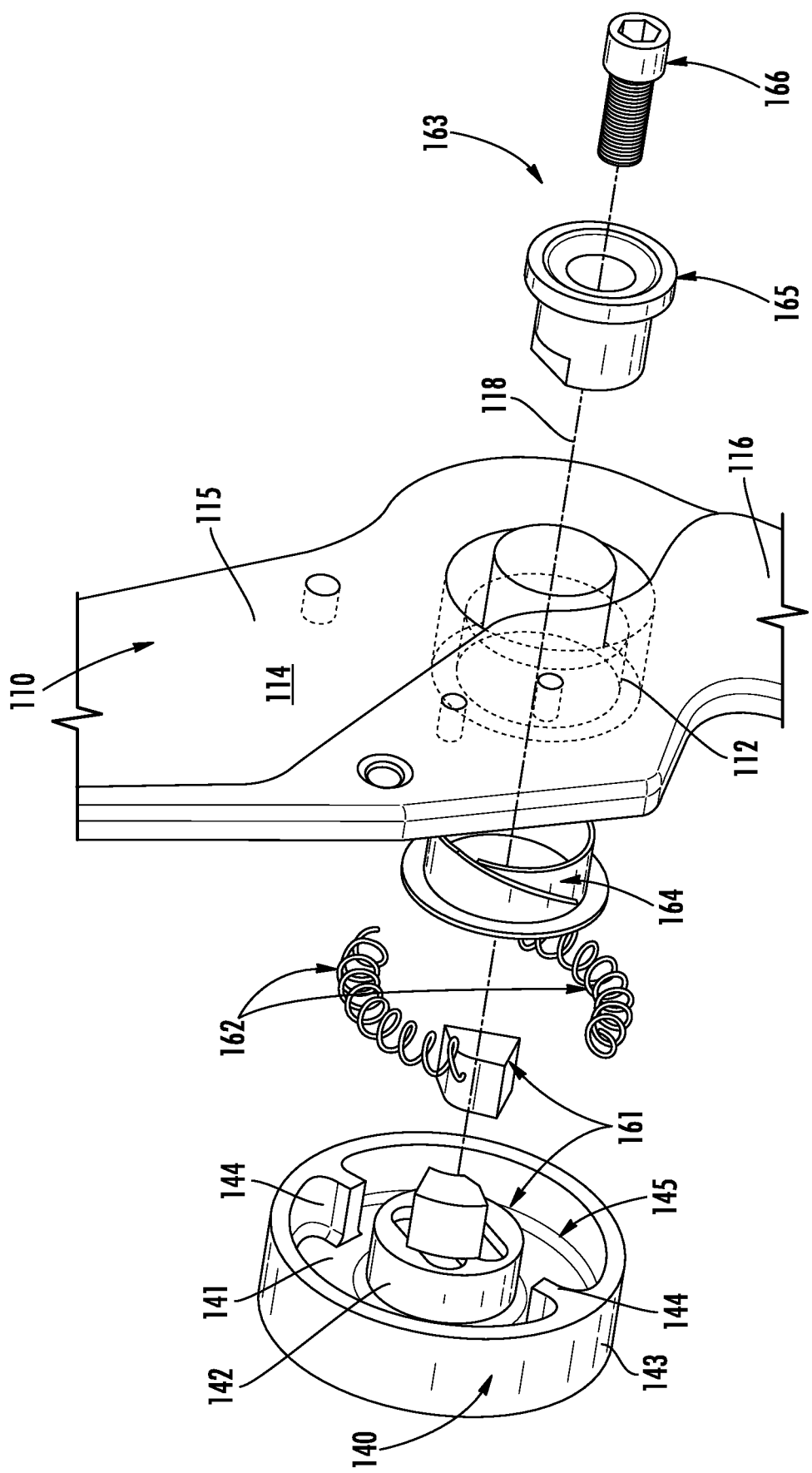
FIG. 2 is an exploded perspective view of components of the seat of FIGS. 1A and 1B in accordance with embodiments.
Figure 3:
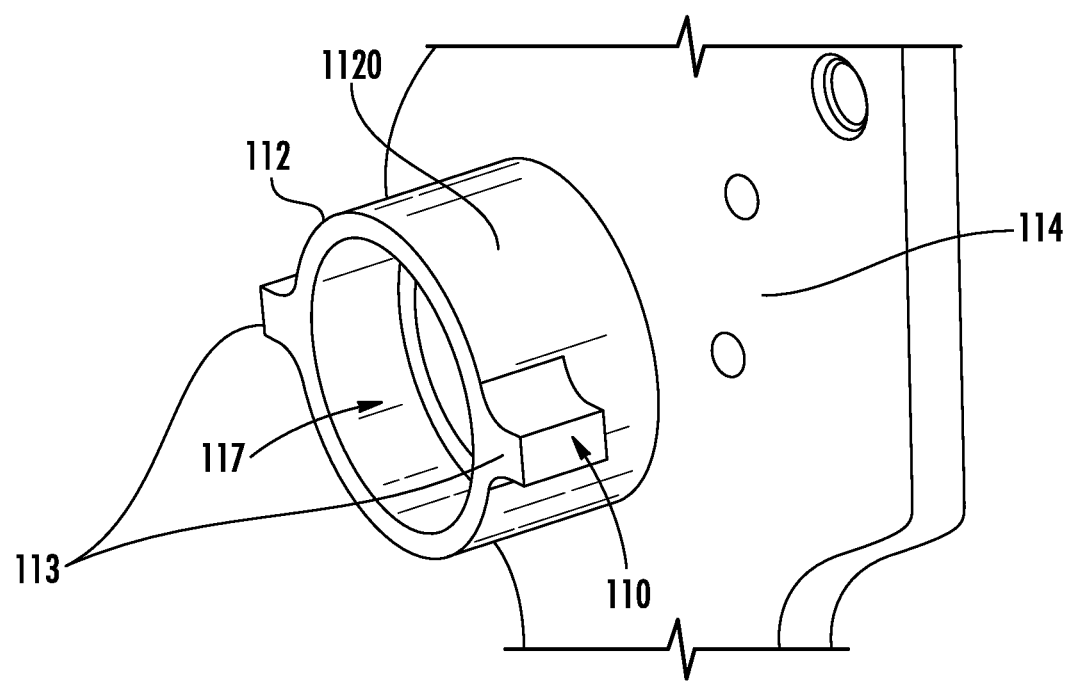
FIG. 3 is an enlarged perspective view of one of the components of FIG. 2 from a different angle.

In accordance with embodiments, the elastic assembly 160 can further include a bearing assembly 163 to support the elastic assembly 160. As shown in FIG. 2, the bearing assembly 163 can include a nyliner bushing 164, which is insertable into the aperture 117 from between the fixed seat structure 140 and the seat pan lever 111, an additional bushing 165, which is insertable into the aperture 117 from the other side of the set pan lever 111, and a fastening element 166 to secure the nyliner bushing 164 and the additional bushing 165 together.

In accordance with embodiments, each damper 161 can be formed of material that is one or more of deformable and compliant, such as polyurethane foam, and each arc-spring 162 can be provided as a compression spring. Of course, it is to be understood that other materials can be used for the dampers 161.

The elastic assembly 160 is thus configured to permit first movements of the pair of first stoppers 113 through the annulus 145 relative to each corresponding one of the pair of second stoppers 145 where such first movements are in association with first rotations of the seat pan lever 111 about the rotational axis 118. The elastic assembly 160 is thus also configured to urge second movements of the pair of first stoppers 113 through the annulus 145 relative to each corresponding one of the pair of second stoppers 144 where such second movements are in association with second rotations of the seat pan lever 111 about the rotational axis 118.

Figure 4B:
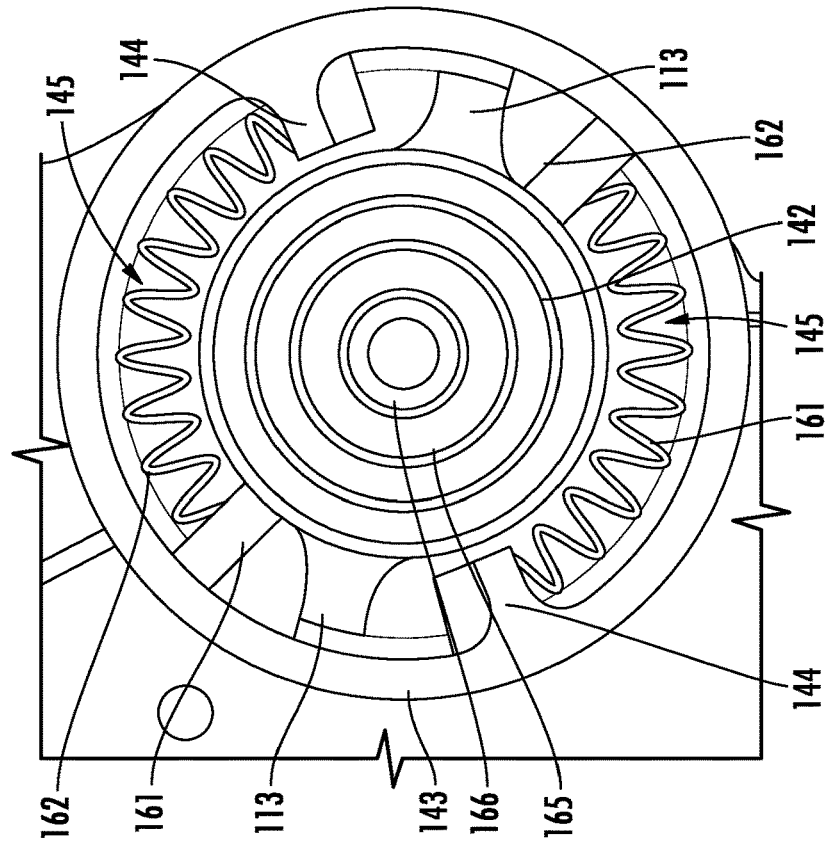
FIG. 4B is an axial view of an elastic assembly with the seat of FIGS. 1A and 1B in the fully open position in accordance with embodiments.

An operation of the elastic assembly 160 will now be described with continued reference to FIGS. 4A and 4B. As shown in FIG. 4A, at an initial time with the seat 102 of FIG. 1A in the stowed position, the arc-springs 162 are extended through corresponding arc-segments of the annulus 145 such that the dampers 161 and the first stoppers 113 are circumferentially displaced from the second stoppers 144. As the seat 102 of FIGS. 1A and 1B is rotated by an operator at a pressure which exceeds the bias of the arc-springs 162 such that the seat pan lever 111 rotates about the rotational axis 118, the first stoppers 113 begin to move through the annulus 145 along the corresponding arc-segments toward the second stoppers 144. At the fully opened position of the seat 102 of FIG. 1B, the first stoppers 113 have completely moved through the annulus 145 along the corresponding arc-segments toward the second stoppers 144 and in doing so have completely compressed the arc-springs 162. Once the pressure applied by the operator is released, the arc-springs 162 and the elastic assembly 160 as a whole will urge the seat 102 to return to the stowed position of FIG. 1A. The dampers 161 serve to soften the impacts and attenuate the velocity of the seat stowage.

Technical effects and benefits of the features described herein are the provision of a seat with self-stowage capability for use in an aircraft, for example, that has a reduced number of parts and eliminates the problematic torsion spring plates and the damper assembly of conventional designs.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A seat with self-stowage capability, the seat comprising:
   a seat pan lever which is rotatable between stowed and open positions;
   a fixed seat structure comprising an annulus; and
   an elastic assembly comprising a damper and an arc-spring disposable within the annulus to permit first rotations of the seat pan lever from the stowed position to the open positions and to urge second rotations of the seat pan lever from the open positions to the stowed position,
   wherein the arc-spring comprises:
   a major longitudinal curvature that follows a corresponding curvature of the annulus; and
   a minor curvature, which is defined along the major longitudinal curvature, and which is constrained within radial and axial dimensions of the annulus.

2. The seat according to claim 1, wherein a fully open position is 90° from the stowed position.

3. A seat with self-stowage capability, the seat comprising:
   a seat pan comprising a lever, a boss coupled with the lever and defining an axis about which the lever is rotatable and a first stopper coupled with the boss;
   a fixed seat structure comprising a second stopper and an annulus in which the second stopper is fixed and the first stopper is disposable; and
   an elastic assembly comprising an arc-spring and being disposable within the annulus between the first and second stoppers to permit first movements of the first stopper through the annulus relative to the second stopper in association with first rotations of the lever about the axis and to urge second movements of the first stopper through the annulus relative to the second stopper in association with second rotations of the lever about the axis,
   wherein the arc-spring comprises:
   a major longitudinal curvature that follows a corresponding curvature of the annulus; and
   a minor curvature, which is defined along the major longitudinal curvature, and which is constrained within radial and axial dimensions of the annulus.

4. The seat according to claim 3, wherein the lever is rotatable about the axis between a stowed rotational position and open rotational positions.

5. The seat according to claim 3, wherein the boss is partially cylindrical and the first stopper extends radially outwardly from an exterior surface of the boss.

6. The seat according to claim 3, wherein the seat pan comprises a pair of first stoppers and the fixed seat structure comprises a pair of second stoppers.

7. The seat according to claim 3, wherein:
   the elastic assembly further comprises a damper, which is disposable for abutment with the first stopper, and
   the arc-spring is anchored between the second stopper and the damper.

8. The seat according to claim 7, wherein the damper comprises material that is one or more of deformable and compliant.

9. The seat according to claim 7, wherein the arc-spring comprises an arc-compression spring, which is compressed in the circumferential dimension of the annulus.

10. The seat according to claim 7, wherein the elastic assembly further comprises a bearing assembly to support the elastic assembly.

11. The seat according to claim 7, wherein a full extension of the arc-spring positions the damper and the first stopper less than halfway around the annulus.

12. An aircraft, comprising:
    a fixed wall structure; and
    a seat with self-stowage capability, comprising:
       a seat pan comprising a lever, a boss coupled with the lever and defining an axis about which the lever is rotatable relative to the fixed wall structure between stowed and open positions and a first stopper coupled with the boss;
       a fixed seat structure which is fixed to the fixed wall structure and comprises a second stopper and an annulus in which the second stopper is fixed and the first stopper is disposable; and
       an elastic assembly comprising an arc-spring and being disposable within the annulus between the first and second stoppers to permit first movements of the first stopper through the annulus relative to the second stopper in association with first rotations of the lever about the axis and to urge second movements of the first stopper through the annulus relative to the second stopper in association with second rotations of the lever about the axis, wherein the arc-spring comprises:

a major longitudinal curvature that follows a corresponding curvature of the annulus; and a minor curvature, which is defined along the major longitudinal curvature, and which is constrained within radial and axial dimensions of the annulus.

13. The aircraft according to claim 12, wherein a fully open position is 90° from the stowed position.

14. The aircraft according to claim 12, wherein the boss is partially cylindrical and the first stopper extends radially outwardly from an exterior surface of the boss.

15. The aircraft according to claim 12, wherein the seat pan comprises a pair of first stoppers and the fixed seat structure comprises a pair of second stoppers.

16. The aircraft according to claim 12, wherein:

the elastic assembly further comprises a damper, which is disposable for abutment with the first stopper, and the arc-spring is anchored between the second stopper and the damper.

17. The aircraft according to claim 16, wherein the damper comprises material that is one or more of deformable and compliant.

18. The aircraft according to claim 16, wherein the arc-spring comprises an arc-compression spring, which is compressed in the circumferential dimension of the annulus.

19. The aircraft according to claim 16, wherein the elastic assembly further comprises a bearing assembly to support the elastic assembly.

20. The aircraft according to claim 16, wherein a full extension of the arc-spring positions the damper and the first stopper less than halfway around the annulus.

\* \* \* \* \*